United States Patent [19]
Ueda

[11] Patent Number: 5,199,030
[45] Date of Patent: Mar. 30, 1993

[54] DIGITAL SIGNAL TRANSMISSION DEVICE
[75] Inventor: Mamoru Ueda, Kanagawa, Japan
[73] Assignee: Sony Corporation, Tokyo, Japan
[21] Appl. No.: 755,568
[22] Filed: Sep. 5, 1991
[30] Foreign Application Priority Data
  Sep. 11, 1990 [JP] Japan ................................. 2-238932
[51] Int. Cl.$^5$ ............................................. H04J 3/02
[52] U.S. Cl. ........................................ 370/68; 370/53;
      370/58.1; 370/66; 340/825.03; 381/80; 381/81
[58] Field of Search ................. 370/53, 58.1, 66, 68;
      340/825.03; 381/80, 81, 85

[56] References Cited
U.S. PATENT DOCUMENTS

4,564,936  1/1986  Takahashi ............................. 370/68
4,740,959  4/1988  Kosugi et al. ...................... 370/68 X

*Primary Examiner*—Douglas W. Olms
*Assistant Examiner*—Russell W. Blum
*Attorney, Agent, or Firm*—Alvin Sinderbrand; William S. Frommer

[57] ABSTRACT

A digital signal transmission device for reproducing plural channel informational data from a digital signal formed of plural channels of informational data accompanied by channel identification data for identifying the channels in which the informational data is to be processed the digital signal having been transmitted through a single transmission line. Identification data conversion means converts channel identification data from the form which accompanies the digital signal to a modified form that identifies different channels in which the informational data will be processed.

5 Claims, 8 Drawing Sheets

DIGITAL SIGNAL TRANSMISSION DEVICE

BACKGROUND OF THE INVENTION

1. Field of the Invention

The present invention relates to a signal transmission device and in particular to a digital signal transmission device for transmitting digital signals by using, for example, a serial interface.

2. Related Art

Analog interfaces using, for example, XLR or Canon connectors have been heretofore used for inputting and/or outputting audio signals in analog VTRs, (video tape recorders).

Figure 3:
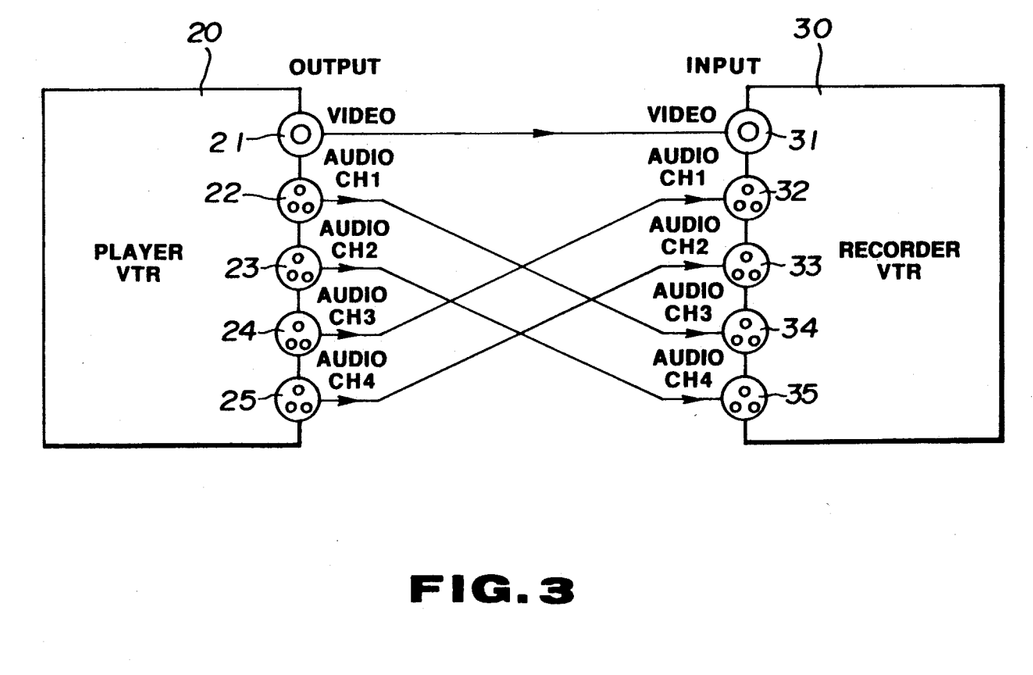
FIG. 3 is an illustrary-connection of an analog interface.

An illustrative connection of an analog interface between two analog VTRs 20 and 30 is shown in FIG. 3.

In FIG. 3, video signals are outputted from a video output terminal 21 of a player VTR 20, and fed to a video input terminal 31 of a recorder VTR 30 via a transmission line such as coaxial cable. A total of four channels (CH1 through CH4) of audio signals are outputted from four audio output terminal 22 through 25 of the player VTR 20, respectively. The VTR 30 of audio signals from the player VTR 20 are transmitted to the recorder VTR 30 by connecting the audio output terminals 22 through 25 of the VTR 20 with the audio input terminals 32 through 35 of the recorder VTR 30 via coaxial cables having Canon connectors at both ends.

Each channel of audio signals from the VTR 20 can be recorded on a desired audio channel of the VTR 30 by changing the connection of four coaxial cables between the audio output terminals of the VTR 20 and the audio input terminals of the VTR 30. The case in which the audio output terminals 22, 23, 24 and 25 are connected with the audio input terminals 34, 35, 32 and 33, respectively is shown in FIG. 3.

There have existed so-called serial interfaces which transmit both digital video and audio signals via a single coaxial cable between digital VTRs.

The connectors which are provided at both ends of the coaxial cable used for such serial interfaces include the so-called BNC type connector.

Transmission of the digital video and audio signals in the format of a serial interface is effected, for example, as follows:

Firstly, the digital video signal is combined with a pattern (for example, a synchronizing pattern for the digital video signals) of information representative of the timing of the horizontal synchronization period and ID (field sequence and line number, etc.) information collectively referred to as a timing reference signal (TRS). The digital audio signal includes signals in a plurality of channels, which are time-compressed. The time-compressed audio data is superposed on the video signal as an AUX (auxiliary and preparatory) data block for a sync chip period of a blanking period of the video signal. The video signal on which the AUX data block is superposed for the sync chip period of the video signal is further converted into serial data and is transmitted.

Figure 4:
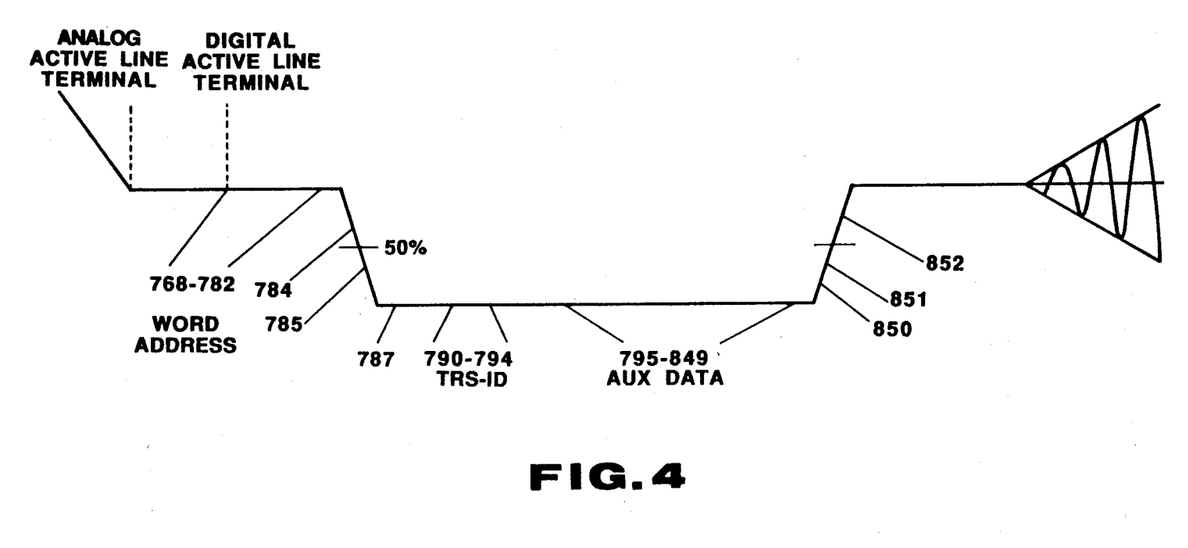
FIG. 4 is a schematic representation of a horizontal synchronization period.
Figure 5:
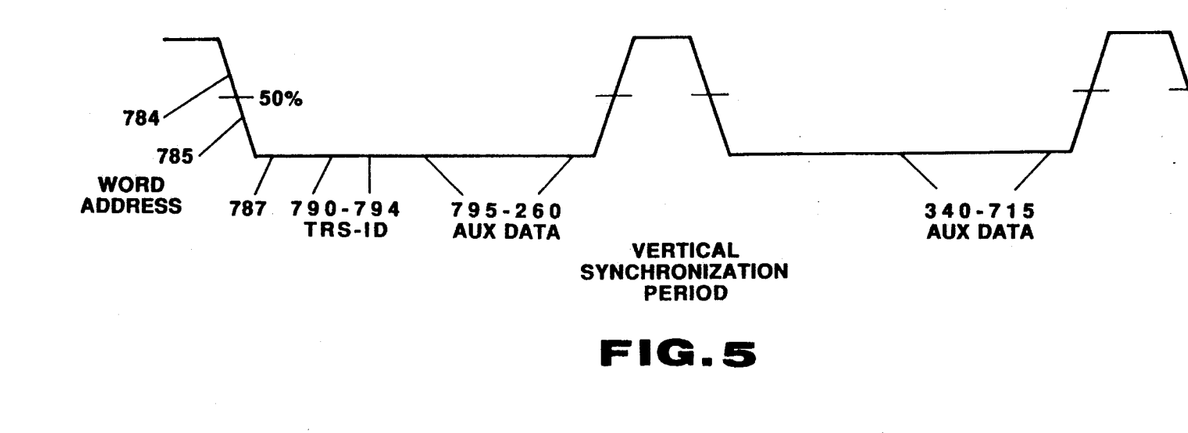
FIG. 5 is a schematic representation of a vertical synchronization period.
Figure 6:
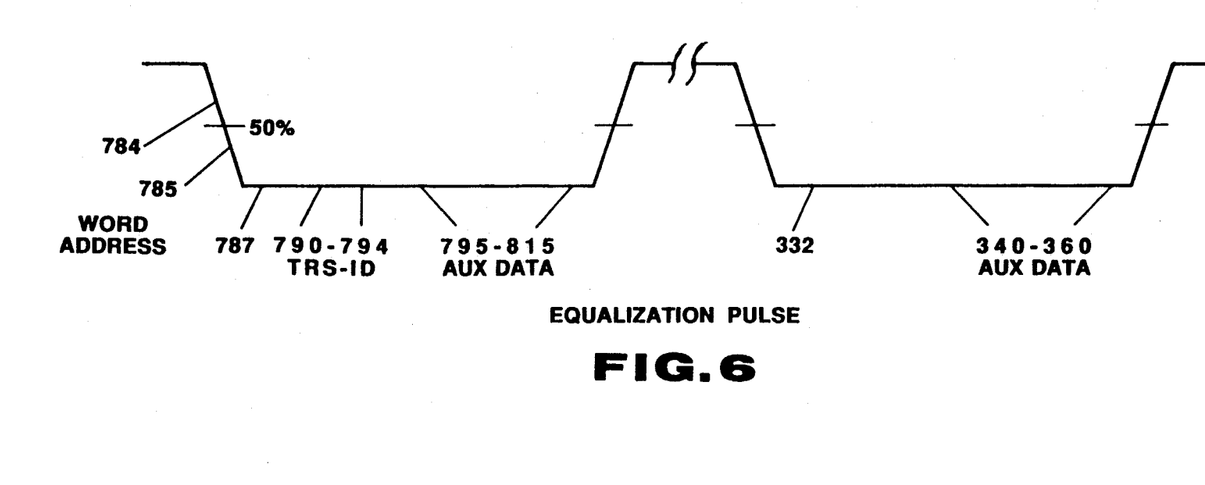
FIG. 6 is a schematic representation of an equalization pulse.
Figure 7:
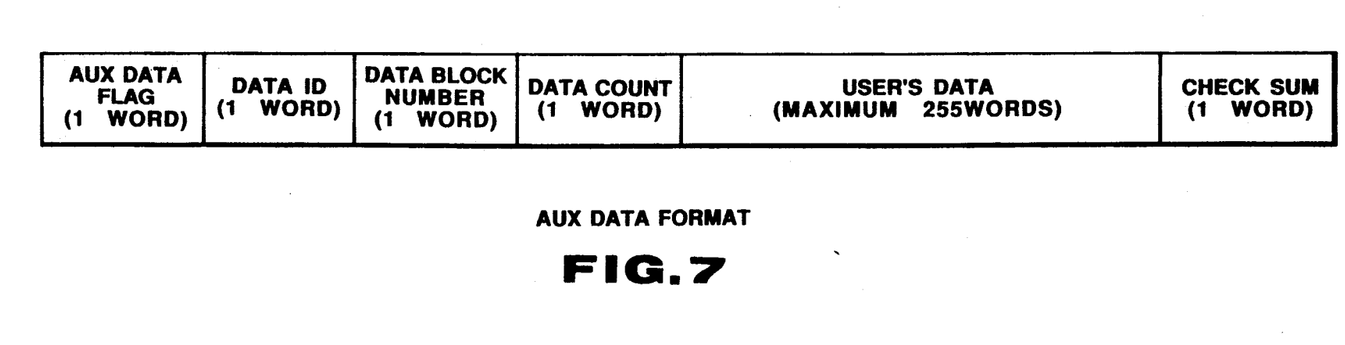
FIG. 7 is a diagram showing an AUX data format.

The AUX data block of the sync chip period is assigned a period of word numbers 795 to 849 in the horizontal synchronization period as shown in FIG. 4 and is assigned a period of word numbers 795 to 260 and 340 to 715 in the vertical synchronization period as shown in FIG. 5 and is further assigned to a period of word numbers 795 to 815 and 340 to 360 in an equalization pulse as shown in FIG. 6.

The format of the AUX data block includes 10 bit (one word) AUX data flag ($3FC^{hex}$) located at the head of data, a data ID (for example $FF^{hex}$ when AES/EBU digital audio signal is transmitted), a data block number, a data count (the number of bytes of subsequent user's data) and user-selected data, a digital audio signal of maximum 255 words and a one word check sum.

The format of the user's data that may be assigned to the digital audio signal is shown in Table 1.

TABLE 1

| BIT | ADDRESS | | |
|-----|---------|---------|---------|
|     | X3 | X3+1 | X3+2 |
| b9  | $\overline{b8}$ | $\overline{b8}$ | $\overline{b8}$ |
| b8  | $(2^5)$ | $(2^{14})$ | P |
| b7  | $(2^4)$ | $(2^{13})$ | C |
| b6  | $(2^3)$ | $(2^{12})$ | U |
| b5  | $(2^2)$ | $(2^{11})$ | V |
| b4  | $(2^1)$ | $(2^{10})$ | MSB($2^{19}$) |
| b3  | LSB($2^0$) | $(2^9)$ | $(2^{18})$ |
| b2  | CH(MSB) | $(2^8)$ | $(2^{17})$ |
| b1  | CH(LSB) | $(2^7)$ | $(2^{16})$ |
| b0  | Z | $(2^6)$ | $(2^{15})$ |

In Table 1, nine bits (b0 to b8) in each byte (10 bits) of addresses X3, X3+1, X3+2 are used for data and the 10th b9 is the inverse of b8. One sample of digital audio data comprising three bytes (27 bits) other than the bit b9 is transmitted. The 27 bits includes 20 bits of $2^0$ to $2^{19}$ assigned to the audio data, three bits one for each of V (validity), U (user's bit) and C (channel status) as unserial information in AES/EBU, one bit (synchronization bit) representative of the Partitioning of each of 192 samples, two bits for CH bits (CH(MSB) and CH(LSB)) representative of each of channels CH1 to CH4 and one bit for P (parity). CH bits of the CH(MSB) and CH(LSB) are used to identify each channel accordance with in, for example, Table 2.

TABLE 2

|         | CH1 | CH2 | CH3 | CH4 |
|---------|-----|-----|-----|-----|
| CH(MSB) | 0   | 0   | 1   | 1   |
| CH(LSB) | 0   | 1   | 0   | 1   |

As shown in Table 2, CH1 is identified when both CH(MSB) and CH(LSB) are "0". CH2 is identified when CH(MSB) is "0" and CH(LSB) is "1". CH3 is identified when CH(MSB) is "1" and CH(LSB) is "0". CH4 is identified when both CH(MSB) and CH(LSB) are "1".

Figure 8:
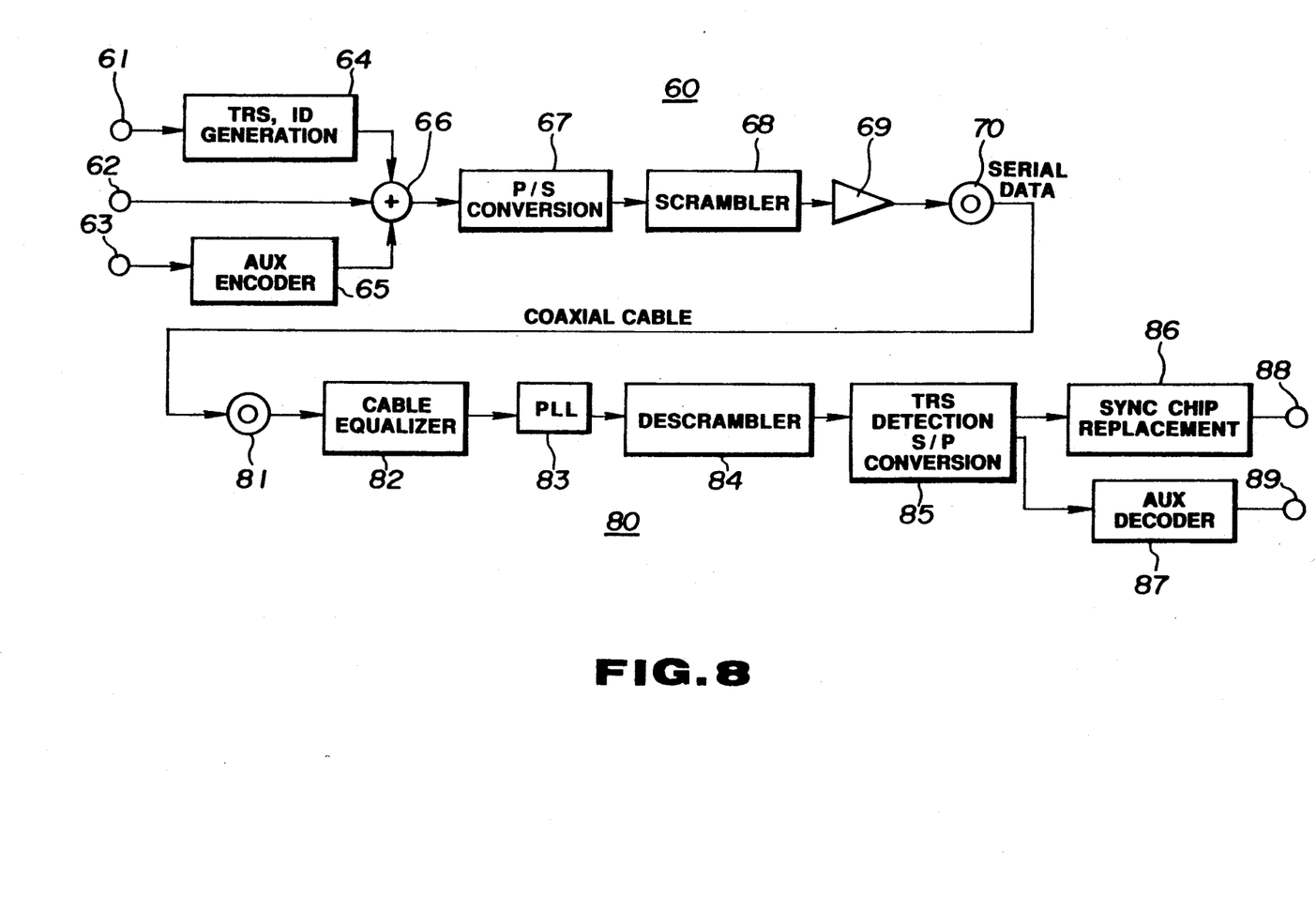
FIG. 8 is a schematic block diagram showing a serial interface transmission and reception circuits.

Referring now to FIG. 8, there is shown a block diagram of a transmitter circuit 60 and a receiver circuit 80 for transmitting and receiving the digital video and audio signal, respectively via the above-mentioned serial interface. The circuit 60 and 80 are provided in a VTR.

In FIG. 8, a timing information generating circuit 64 of the transmitter circuit 60 generates the timing reference signal (TRS) and ID information in accordance with the timing of video signals supplied via an input terminal 61. The output of the timing information generating circuit 64 is fed to an adder 66. Four channel digital audio signals supplied via the terminal 63 are fed to an AUX encoder 65 in which the AUX data block to be superposed upon the video signal for the sync chip period is formed. The data of the AUX data block from the AUX decoder 65 is fed to the adder 66. A digital video signal supplied from an input terminal 62 is also inputted to the adder 66. The adder 66 adds the digital video signal with the TRS and ID and superposes the AUX data block on the digital video signal for the sync chip period of the video signal. The output of the adder 66 is a 10 bit parallel signal as shown in Table 1. The parallel signal is fed to a parallel/serial (P/S) conversion circuit 67. In the (P/S) conversion circuit 67, the parallel signal is converted into serial data by using clock signals 10 times as fast as the reference of the TRS. The output of the P/S conversion circuit 67 is fed to a scrambler 68 in which the serial data is converted into a so-called scrambled NRZ-I signal. The NRZ-I signal is outputted from an output terminal 70 via a buffer 69.

The output terminal 70 is connected with an input terminal 81 of the receiver circuit 80 via a coaxial cable having BNC connectors at both ends thereof. Serial transmitted data which is received by the receiver circuit 80 is compensated for the deterioration of the signal at the higher frequency range due to transmission through the coaxial cable by a cable equalizer 82. The output of the cable equalizer 82 is fed to a descrambler 84 after it has been brought into synchronization by a PLL(phase locked loop) circuit 83. The descrambler 84 decodes the NRZ-I signal. Which then is fed to a detection/conversion circuit 85. The circuit 85 detects the TRS and generates clock signals (parallel clock signals) which are 1/10 as fast as the reference of the TRS. This to converts the serial data into parallel data. The parallel data is fed to an AUX decoder 87 and a sync chip replacement circuit 86. In the sync chip replacement circuit 86, only the video signal, that is, the signal on which the time-compressed digital audio signal is not superposed, is extracted from the parallel data. The output of the sync chip replacement circuit 86 is outputted from an output terminal 88. In the AUX decoder 87, only the AUX data block is extracted from the parallel data. Separation of the digital audio signals in respective channels and time-axis extension is carried out to provide an output from a terminal 89.

Figure 9:
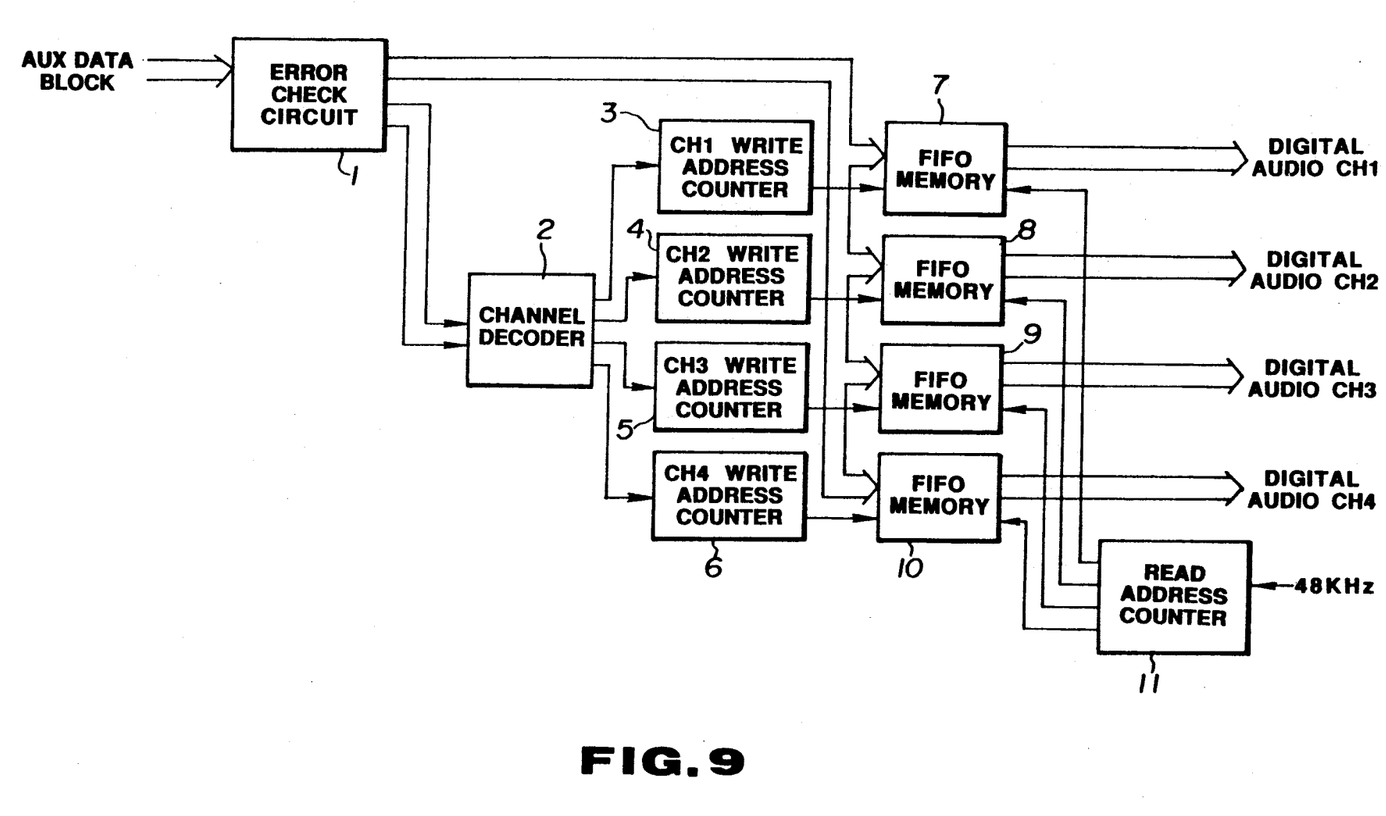
FIG. 9 is a schematic block diagram showing the structure of a prior art audio decoder circuit.

Referring now to FIG. 9, there is shown the detailed structure of the AUX decoder 87.

In FIG. 9, the parallel AUX data is firstly supplied to an error check circuit 1 by which it is subjected to error detection such as parity and sum checks and error correction. Thereafter, the data is fed to FIFO (first-in and first-out) memories 7 to 10. The error check circuit 1 simultaneously carries out extraction of CH bits (CH(MSB) and CH(LSB) in Table 1). The CH bits are fed to a channel decoder 2 which examines the supplied CH bits and determines (identifies) which of channels CH1 to CH4 the data represents. That is, the channel decoder 2 analyzes the respective CH bits in accordance with the conditions shown in Table 2 to determine (identify) which channel data the currently supplied data is. The channel decoder 2 controls the write address counters 3 to 6, one corresponding to each channel, in accordance with this determination to generate write address data for a respective one of FIFO memories 7 to 10 corresponding to the identified channel. Accordingly, the operation of writing into the FIFO memories 7 to 10 is carried out in accordance with the write address data. A read address counter 11 performs a counting operation based upon an audio sampling frequency (48 kHz) and outputs read address data to each of FIFO memories 7 to 10 based upon the counts. Accordingly, data is read out from each of FIFO memories in accordance with the read address data. This enables the digital audio signal of each of CH1 to 4 to be obtained.

Figure 10:
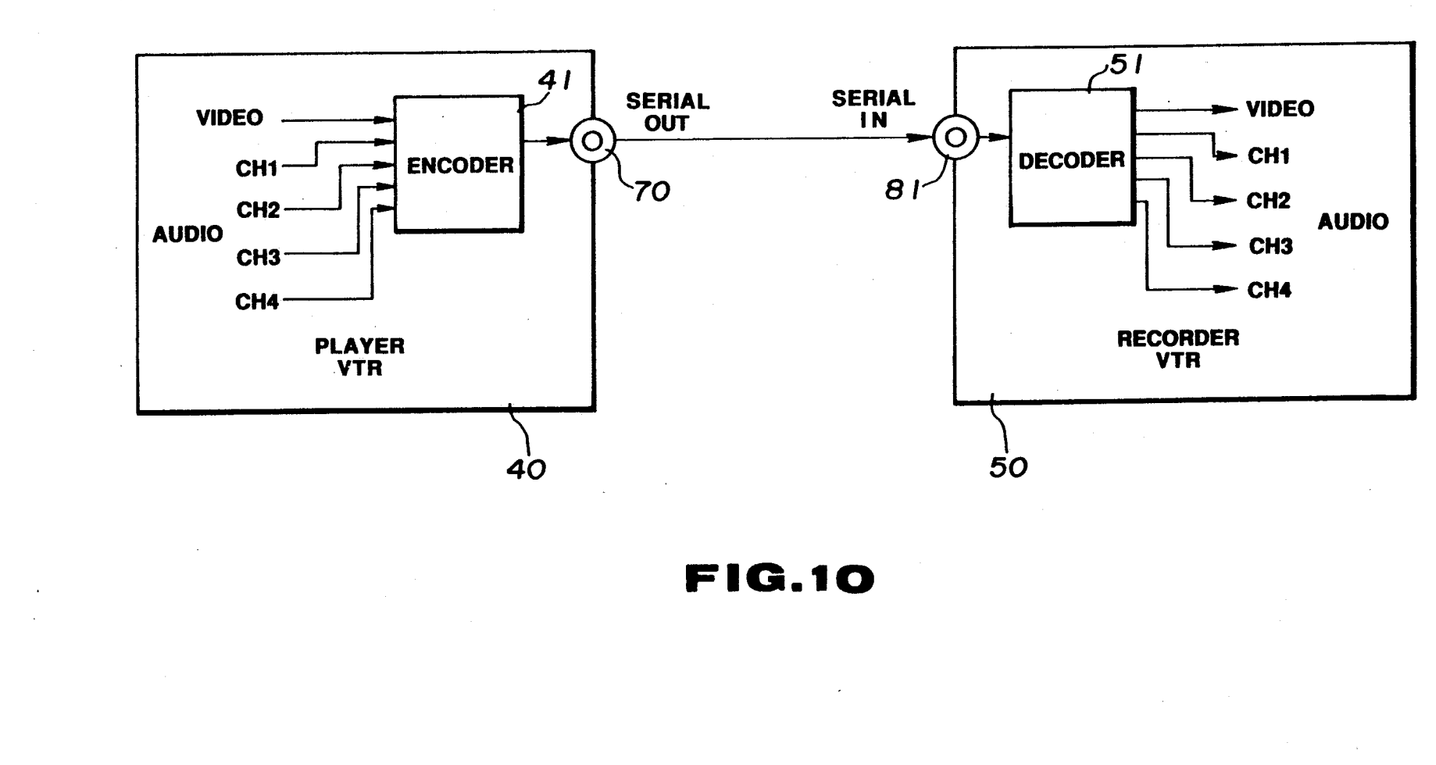
FIG. 10 is a schematic view showing an illustrative connection of a serial interface.

Referring now to FIG. 10, there is shown a connection between two digital VTRs 40 and 50 by the above-mentioned serial interface.

In FIG. 10, digital video signal and four channels of digital audio signals which were reproduced from a recording medium by the player digital VTR 40 are supplied to an encoder 41. The encoder 41 has the capabilities of the transmission circuit 60 shown in FIG. 8. Accordingly, the encoder 41 time-compresses the four channels of digital audio signals and superposes the time-compressed audio signals on the video signal for a sync chip period of the blanking period as an AUX data block and converts the superposed signal into a serial data. The serial data output is transmitted through an output terminal 70.

The output terminal 70 is connected with an input terminal 81 of a recorder digital VTR 50 via a coaxial cable having BNC connectors at both ends. The decoder 51 in the digital VTR 50 has the same capabilities as those of receiver circuit 80 in FIG. 8. Accordingly, the decoder 51 separates the video signal and the AUX data block from the supplied (received) serial data and performs decode processing for obtaining the audio signal of each channel from the AUX data block.

When two player and recorder VTRs 40 and 50 shown in FIG. 10 are connected to each other via the above mentioned serial interface, exchanging of the channels as is done in the above mentioned analog interface is not possible. In other words, if the audio signal of CH1 of the player VTR 40 is to be transmitted to the recorder VTR 50 recording, the audio signal which was reproduced as CH1 of the player VTR 40 will be recorded also as CH1 of the recorder VTR 50 when the serial interface is used. If an audio signal which should not be erased has been recorded at the recording area of the CH1 on a recording medium of the recorder VTR 50, the CH1 audio signal from the player VTR 40 would nevertheless be recorded on the recording area of the CH1. In such a manner, the serial interface cannot desiradly exchange channels for transmission as is done by the analog interface as shown in FIG. 3.

OBJECT OF THE INVENTION

It is an object of the present invention to provide a digital signal transmission device which is capable of desiradly exchanging channels for transmission and reception in case that transmission and reception of digital audio signals is achieved by a serial interface.

SUMMARY OF THE INVENTION

In order to accomplish the above mentioned object, the present invention provides a digital signal transmission device for reproducing plural channel information data from a digital signal including identification data for identifying the channels of the informational data, which has been transmitted through a single transmission line, characterized in that digital transmission device includes identification data conversion means for converting the transmitted identification data representing predetermined channels into identification data representing other channels.

The CH bits (CH(MSB), CH(LSB)) shown in Tables 1 and 2 can be used as the identification data.

In accordance with the present invention, predetermined channels are exchanged with other different channels by exchanging the identification data which have been or are to be transmitted by means of identification data conversion means.

DESCRIPTION OF THE PREFERRED EMBODIMENTS

Figure 1:
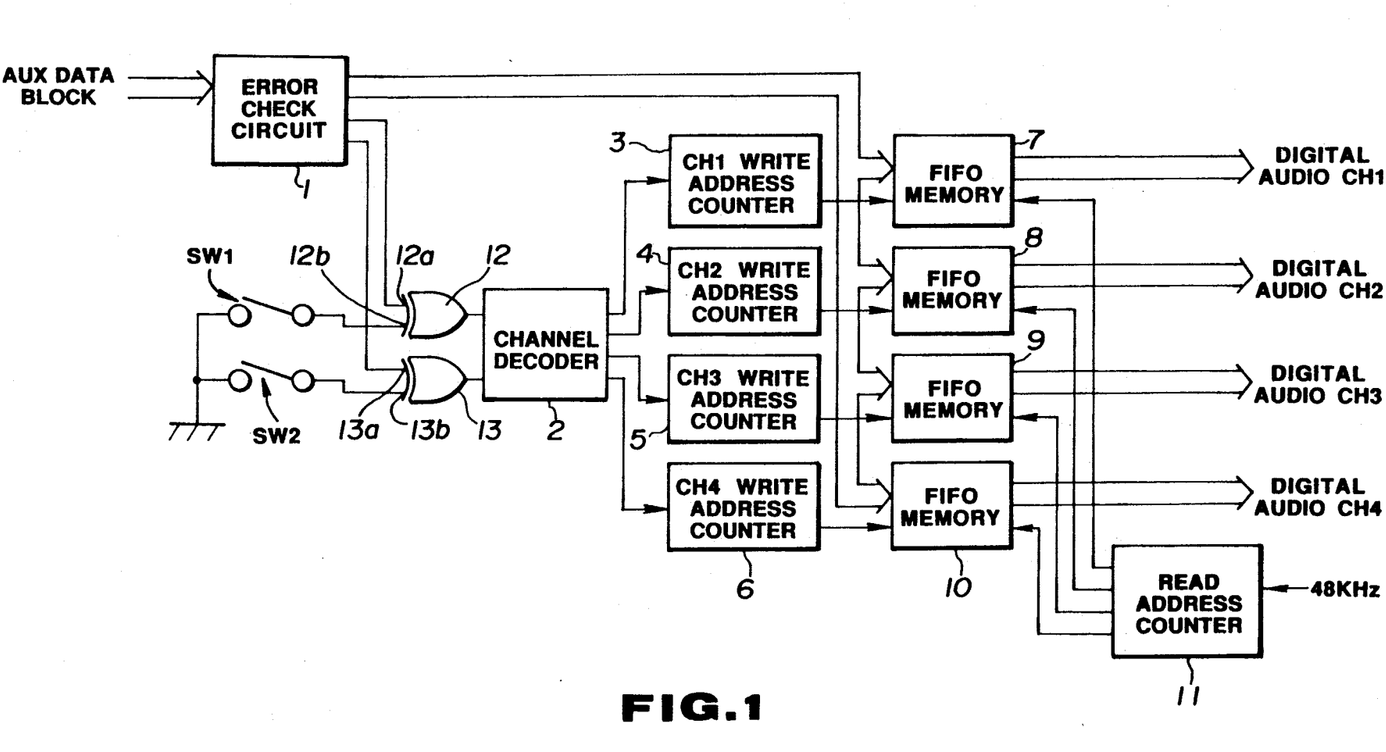
FIG. 1 is a schematic block diagram showing the structure of an audio decoder circuit which is a main part of an embodiment of a digital signal transmission device of the present invention.

Referring now to FIG. 1, there is shown the schematic structure of an audio decoder circuit which is the main part of a digital signal transmission device of the present invention. Since the digital signal transmission device of the present invention is substantially identical with that shown in FIG. 8 except that the audio decoder circuit of FIG. 1 replaces the AUX decoder 87 of FIG. 8, explanation of the structure which is identical with that of FIG. 8 will be omitted herein.

In order words, the digital signal transmission device of the embodiment of the present invention is substantially identical with the transmission device of FIG. 8 which transmits, digital audio signals of four channels CH1 to CH4, which constitute informational data of a plurality of channels, and a digital signal including CH bits (CH(MSB), CH(LSB)) which are identification data for identifying the channels of the informational data, through a coaxial cable, which is a single transmission line having BNC connectors at both ends. The digital signal transmission device includes identification data conversion means comprising switches SW1 and SW2 and Ex-OR gates 12 and 13 for converting the contents of the CH bits of a predetermined channel which have been transmitted to the receiver circuit 80 and supplied to AUX decoder 87 into those of the another of the four channels. The AUX decoder 87 of the device of the embodiment, that is, the audio decoder circuit as shown in FIG. 1, is substantially identical with the audio decoder circuit of FIG. 9 except for the addition of the identification data conversion means. Accordingly, like components are designated with like reference numerals.

In the audio decoder circuit of FIG. 1, the switches SW1 and SW2 have terminals which are grounded and other terminals which are connected with input terminals 12b and 13b of the two-input Ex-OR gates 12 and 13, respectively. The CH bits which were extracted by the error check circuit 1 are supplied to input terminals 12a and 13a of the two-input Ex-OR gates 12 and 13. MSB and LSB of the CH bit are applied to the input terminals 12a and 13a of the Ex-OR gates 12 and 13, respectively. The outputs of the Ex-OR gates 23 and 13 are the CH bit data supplied to the channel decoder 2. That is, the outputs of the Ex-OR gates 12 and 13 are fed to the channel decoder 2 as MSB and LSB of the CH bit.

Specifically, exchange of a predetermined channel to that of another of the channels by converting the contents of the CH bits which have been supplied as mentioned above is achieved by switching logical variables applied to the input terminals into "1" ("H") or "0" ("L"). Switching of the logical variables applied to the input terminals 12b and 13b is carried out by turning the switches SW1 and SW2 on or off so as to ground or not to ground the input terminals 12b and 13b. If the input terminals 12b and 13b of the gates 12 and 13 are grounded via the switches SW1 and SW2, respectively, the logical variables of the input terminals 12b and 13b are "0" ("L"); and if not grounded, they are "1" ("H"). Accordingly, when the input terminals 12b and 13b are "0", the Ex-OR gates 12 and 13 output the as-inputted input applied to the input terminals 12a and 13a, respectively. That is, when the inputs to the input terminals 12a and 13a are "0", the outputs are also "0". When the inputs are "1", the outputs are also "1". In order words, LSB and MSB of the CH bits supplied to the input terminals 12a and 13a are outputted without being converted. In contrast to this, when the input terminals 12b and 13b are "1", the inputs to the input terminals 12a and 13a are inverted and outputted. That is, when the inputs to the input terminals 12a and 13a are "0", the outputs are "1". When the inputs are "1", the outputs are "0". In other words, LSB and MSB of the CH bits applied to the input terminals 12a and 13a are inverted and outputted.

TABLE 3

| GATE 13 (MSB) | GATE 12 (LSB) | CH(CH BIT) ON RECEPTION | CH(CH BIT) AFTER EXCHANGE |
|---|---|---|---|
| 0 | 0 | CH1(00) | CH1(00) |
|   |   | CH2(01) | CH2(01) |
|   |   | CH3(10) | CH3(10) |
|   |   | CH4(11) | CH4(11) |

LOGICAL VARIABLES OF TERMINALS 12b AND 13b OF EACH GATE

TABLE 3-continued

| LOGICAL VARIABLES OF TERMINALS 12b AND 13b OF EACH GATE | | | |
|---|---|---|---|
| GATE 13 (MSB) | GATE 12 (LSB) | CH(CH BIT) ON RECEPTION | CH(CH BIT) AFTER EXCHANGE |
| 1 | 0 | CH1(00) CH2(01) CH3(10) CH4(11) | CH3(10) CH4(11) CH1(00) CH2(01) |
| 0 | 1 | CH1(00) CH2(01) CH3(10) CH4(11) | CH2(01) CH1(00) CH4(11) CH3(10) |
| 1 | 1 | CH1(00) CH2(01) CH3(10) CH4(11) | CH4(11) CH3(10) CH2(01) CH1(00) |

In Table 3, when both of the input terminals 12b and 13b of the Ex-OR gates 12 and 13 are "0", the CH bits on the reception channels are the same as the converted CH bits (gate outputs). In other words, the MSB and LSB of the CH bits are outputted without being converted. When the input terminal 12b of the gate 12 is "0" and the input terminal 13b of the gate 13 is "1", the CH bits of CH1 ("0" and "0") are converted into the CH bits of the CH3 ("1" and "0"). In other words, the CH bits of MSB ("0") and LSB ("0") are converted into the CH bits of MSB ("1") and LSB ("0"), respectively. Similarly, the CH bits ("0", "1") of the CH2 are converted into the CH bits ("1", "1") of the CH4, the CH bits ("1", "0") of the CH3 are converted into the CH bits ("0", "0") of the CH1, and the CH bits ("1", "1") of the CH4 are converted into ("0", "1") of the CH2. When the input terminal 12b of the gate 12 is "1" and the input terminal 13b of the gate 13 is "0", the CH bits of the CH1 are converted into CH2, the CH bits of the CH2 are converted into those of CH1, the CH bits of the CH3 into those of CH4 and the CH bits of the CH4 into those of the CH3. When the input terminals 12b and 13b of the gates 12 and 13 both are "1", the CH bits of CH1, CH2, CH3 and CH4 are converted into those of the CH4, CH3, CH2 and CH1, respectively. As shown in Table 3, the contents of the supplied CH bits are converted into those of the other bits by the identification data conversion means to supply the converted CH bits to the channel decoder 2. Thus, exchange of the channels is made possible.

Although exchange of the channels is performed at the receiver in the above mentioned embodiments, exchange of the channels at the transmitter is possible in accordance with the present invention.

Figure 2:
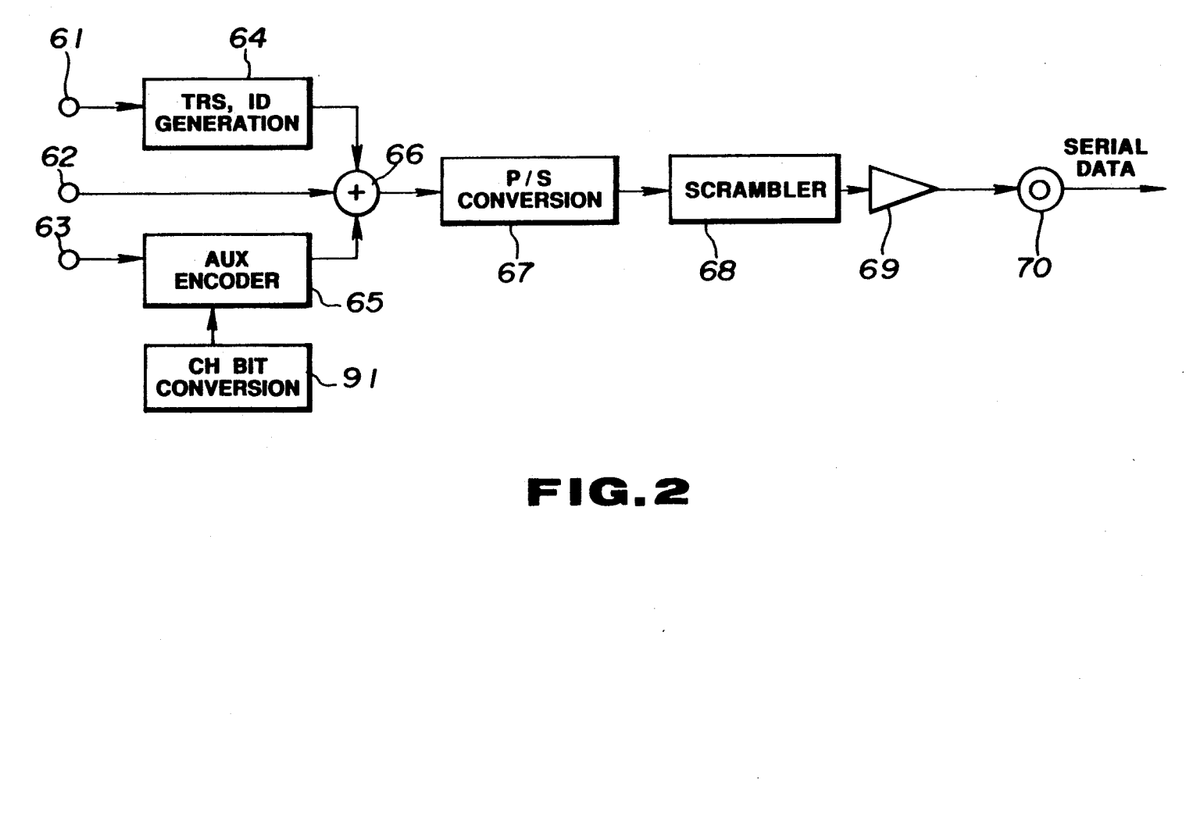
FIG. 2 is a block diagram showing a main part of another embodiment of the present invention.

A device of the latter embodiment is shown in FIG. 2. The device includes a CH bit conversion circuit 91 which operates as identification data conversion means for converting the contents of the CH bits of predetermined channels to be transmitted into those of another of the four channels in a digital signal transmission device for transmitting a digital signal including informational data of plural channels CH1 to CH4 (digital audio signals of the channels CH1 to CH4) and an identification data (CH bits) for identifying the channels of the informational data. Only the main transmission circuits are shown in FIG. 2.

The CH bit conversion circuit 91 may be similar to that of FIG. 1. However, in this case the CH bits which are supplied to the input terminals 12b and 13b of the Ex-OR gates 12 and 13 are supplied from the AUX encoder 65 of FIG. 8. Accordingly, the AUX encoder 65 is formed in such a manner that after the AUX data block is formed and only the CH bits are supplied to the CH bit conversion circuit 91.

As mentioned above, in the embodiments of the present invention identification data conversion means having a simple structure, such as Ex-OR gates and switches is used to convert the content of the identification data received at the receiver or the content of the identification data to be transmitted by the transmitter so that channel exchange of the digital signals to be received or transmitted via a single transmission line is made possible.

It is to be understood that the present invention is not limited to only to the serial interface shown in FIGS. 1 and 2, but is applicable to a device such as the AES/EBU interface which transmits two or more channel data via one cable.

The identification data conversion means in the above mentioned embodiment may be formed of ROMs (read only memories) in which data of respective CH bits are stored and CH bits corresponding to the manner of the exchange of the channels may be read from the ROMs.

In the digital signal transmission device of the present invention, conversion of the contents of identification data which have been transmitted or are to be transmitted enables the exchange of channels of the digital signals which are received or transmitted via a single transmission line.

What is claimed is:

1. Apparatus for changing channel identification data which normally accompany digital information signals transmitted serially between two devices via coaxial cable and which identify individual channels in which said digital information signals are respectively processed, said apparatus comprising: channel decoding means having an input coupled to receive said channel identification data and operable to decode said channel identification data for detecting the individual channel to which a digital information signal is to be supplied for processing; converting means coupled to the input of said channel decoding means for supplying channel identification data thereto; and conversion control means coupled to said converting means and selectively operable to control said conversion means to convert said channel identification data from the form thereof which accompanies a digital information signal and identifies a particular channel to a modified form that identifies a different channel to which said digital information signal is supplied for processing.

2. The apparatus of claim 1 wherein said two devices comprise transmitting and receiving devices, respectively, and said converting means is disposed at said transmitting device.

3. The apparatus of claim 1 wherein said two devices comprise transmitting and receiving devices, respectively, and said converting means is disposed at said receiving device.

4. The apparatus of claim 2 or 3 in which said conversion control means includes first and second switches for outputting signals having high and low levels; and said converting means includes a first exclusive OR gate having one input terminal to which the most significant bit of the channel identification data is applied and having another input terminal to which the output signal of the first switch is applied, and a second exclusive OR gate having one input terminal to which the least significant bit of the channel identification data is applied and having another input terminal to which the output signal of the second switch is applied so that outputs of the first and second exclusive OR gates are the most and least significant bits of the channel identification data, respectively.

5. The apparatus of claim 2 or 3 in which said converting means includes a read only memory in which converted channel identification data are stored and from which the stored channel identification data are read in response to the channel identification data that accompanies said digital information signals.

* * * * *